United States Patent [19]

Patel et al.

[11] Patent Number: 4,728,515

[45] Date of Patent: * Mar. 1, 1988

[54] LOW MOISTURE CHEWING GUM COMPOSITIONS AND METHODS OF PREPARATION

[75] Inventors: Mansukh M. Patel, Downers Grove; Michael A. Reed, Evanston; William J. Wokas, Bollingbrook; Vasek J. Kures, Willow Springs, all of Ill.

[73] Assignee: Wm. Wrigley Jr. Company, Chicago, Ill.

[*] Notice: The portion of the term of this patent subsequent to Jun. 9, 2004 has been disclaimed.

[21] Appl. No.: 35,506

[22] Filed: Apr. 7, 1987

Related U.S. Application Data

[60] Division of Ser. No. 788,078, Oct. 16, 1985, Pat. No. 4,671,961, which is a continuation-in-part of Ser. No. 611,991, May 18, 1984, abandoned.

[51] Int. Cl.$^4$ .................................................. A23G 3/30
[52] U.S. Cl. .......................................... 426/3; 426/658
[58] Field of Search ............................. 426/3, 658, 613

[56] References Cited

U.S. PATENT DOCUMENTS

| | | | |
|---|---|---|---|
| Re. 30,197 | 1/1980 | Klose | 426/3 |
| 2,822,303 | 2/1958 | Campbell | 426/658 |
| 2,976,159 | 3/1961 | Swisher | 426/658 |
| 3,332,783 | 7/1967 | Frey | 426/660 |
| 3,565,765 | 2/1971 | Heady et al. | 426/3 |
| 3,582,359 | 6/1971 | Horn et al. | 426/3 |
| 3,857,965 | 12/1974 | Ream | 426/3 |
| 4,001,435 | 1/1977 | Hirao et al. | 426/658 |
| 4,039,689 | 8/1977 | Bone | 426/658 |
| 4,055,676 | 10/1977 | Foulkes | 426/658 |
| 4,156,740 | 5/1979 | Glass et al. | 426/3 |
| 4,208,431 | 6/1980 | Friello et al. | 426/5 |
| 4,217,368 | 8/1980 | Witzel et al. | 426/5 |
| 4,238,475 | 12/1980 | Witzel et al. | 426/3 |
| 4,248,895 | 2/1981 | Stroz et al. | 426/3 |
| 4,250,196 | 2/1981 | Friello | 426/3 |
| 4,271,197 | 6/1981 | Hopkins | 426/658 |
| 4,271,199 | 6/1981 | Cheruhuri et al. | 426/5 |
| 4,276,312 | 6/1981 | Merritt | 426/658 |
| 4,279,931 | 7/1981 | Verwaerde et al. | 426/658 |
| 4,281,028 | 7/1981 | Walon | 426/613 |
| 4,301,178 | 11/1981 | Witzel et al. | 426/3 |
| 4,316,915 | 2/1982 | Friello et al. | 426/5 |
| 4,346,116 | 8/1982 | Verwaerde et al. | 426/658 |
| 4,372,942 | 2/1983 | Cimiluca | 426/658 |
| 4,378,374 | 3/1983 | Reggio et al. | 426/3 |
| 4,382,962 | 5/1983 | DeVas et al. | 426/3 |
| 4,384,005 | 5/1983 | McSweeney | 426/250 |
| 4,445,938 | 5/1984 | Verwaerde et al. | 127/29 |
| 4,466,983 | 8/1984 | Cifrese et al. | 426/5 |
| 4,514,422 | 4/1985 | Yang et al. | 426/3 |

FOREIGN PATENT DOCUMENTS 0196640 8/1986 European Pat. Off. .
0196641 8/1986 European Pat. Off. .
WO/8401693 5/1984 PCT Int'l Appl. .

*Primary Examiner*—Jeanette Hunter
*Attorney, Agent, or Firm*—Willian Brinks Olds Hofer Gilson & Lione Ltd.

[57] ABSTRACT

Low moisture chewing gum compositions and methods of preparation using carbohydrate syrup-plasticizer compositions to improve flexibility and shelf life characteristics are disclosed. The syrup comprises carbohydrate solids and water, with less than 30% of the solids having a degree of polymerization (DP) of 1 and more than 20% solids with a DP of 4 or greater. The ratio of carbohydrate solids to plasticizing agent in the composition is between 0.5:1 and 100:1 and the total water content of composition is less than 20%. The syrup-plasticizer composition is prepared by providing a carbohydrate syrup or combined syrups with the proper carbohydrate solids distribution, combining a plasticizer such as glycerine or propylene glycol and evaporating water from the combined syrup plasticizer composition. Chewing gum made using the evaporated syrup composition includes about 5% to about 75% gum base, about 5% to about 75% of a sweet bulking agent, about 5% to about 75% of the evaporated syrup composition and optional ingredients used in conventional chewing gums but less than 2% moisture.

39 Claims, No Drawings

4,728,515

LOW MOISTURE CHEWING GUM COMPOSITIONS AND METHODS OF PREPARATION

CROSS REFERENCE TO RELATED APPLICATION

This application is a divisional application of U.S. application Ser. No. 06/788,078, filed Oct. 16, 1985 now U.S. Pat. No. 4,671,861, which is a continuation-in-part application of U.S. application Ser. No. 611,991, filed May 18, 1984 now abandoned in the name of Mansukh M. Patel, Michael A. Reed and Vasek J. Kures and entitled "Composition and Method for Improved Flexibility Retention in Chewing Gum."

BACKGROUND OF THE INVENTION

The present invention relates generally to improved chewing gum compositions including improved carbohydrate syrup compositions and methods of preparation of the chewing gum compositions.

The use of carbohydrate syrups in chewing gums is well known in the art. In particular, relatively low D.E. (dextrose equivalent) carbohydrate syrups are especially desirable for the texture and binding effects which the solids in such syrups provide in certain applications.

However, it has been found that relatively high levels of moisture present in typical carbohydrate syrups have proven unsatisfactory for various reasons. For example, conventional chewing gum has been generally thought to require a moisture content of approximately 3 to 5 percent by weight for aceptable softness and flexibility. Nearly all of the moisture in chewing gum is provided by carbohydrate syrups such as conventional corn syrups or sugar alcohol syrups (including sorbitol solutions and hydrogenated starch hydrolysate solutions) typically added to chewing gum compositions to improve binding and softness characteristics in the gum. A major problem with conventional gum compositions is that they gradually become hard and brittle from moisture loss which occurs when the chewing gum is stored at a relative humidity lower than the equilibrium relative humidity of the gum. When moisture is lost from the gum, ingredients originally dissolved in the water recrystallize, causing the gum to become stiff and brittle. For this reason, chewing gum is typically wrapped in moisture-impermeable packages to prevent loss of moisture. However, even with such packaging, the moisture may eventually migrate out of the gum.

In sugarless chewing gums, hydrogenated starch hydrolysates and sugar alcohols such as sorbitol are often used as sweeteners and bulking agents. Such sugarless gums are hygroscopic in nature, attracting moisture from the atmosphere. The result is that, over time, sugarless gums often become "sticky" and loose their body and texture. It is desirable to use relatively low-moisture formulations including low-moisture carbohydrate syrups in such gums so that the gums will be able to withstand greater moisture absorption before they reach an undesirably "sticky" state.

In sugarless gums, it is sometimes advantageous to use hydrogenated starch hydrolysate solutions rather than sorbitol solutions because of the greater binding effects of the higher molecular weight components in the hydrogenated starch hydrolysates solids. However, hydrogenated starch hydrolysate syrups typically have a relatively high moisture level. The reduction of the amount of moisture in such syrups allows more hydrogenated starch hydrolysates to be used without exceeding moisture limitations in the final chewing gum products.

Furthermore, it has been found desirable to minimize the moisture content of chewing gum compositions in order to prevent the deterioration of certain moisture-sensitive ingredients. For example, it is well known that the stability of artificial dipeptide sweeteners such as aspartame (L-spartyl-L-phenylalanine methyl ester) in chewing gums is a function of water activity, time, temperature and pH. In aqueous systems, aspartame spontaneously converts to diketopiperazine with proportional loss of sweetness. The rate of this conversion reaction can be controlled by minimizing the water activity in chewing gums containing aspartame.

These and other undesirable effects of relatively high moisture levels in chewing gums containing carbohydrate syrup compositions can be minimized by reducing or evaporating moisture from the carbohydrate syrups. However, problems have been encountered in economically evaporating moisture initially present in certain carbohydrate syrup compositions, particularly low D.E. carbohydrate syrups, to desired relatively low levels. Specifically, as such syrups are evaporated, their viscosities increase substantially, with the result that at some moisture levels the syrups cannot be economically processed in conventional evaporating equipment. Furthermore, even when evaporation to a desired moisture content is possible, further handling of the syrup, especially if it is cooled after evaporation, is difficult if not impossible. Thus, the syrup must be kept hot to facilitate handling and used quickly to prevent degradation by the heat. If the syrup is cooled, the extreme viscosity makes reheating it a slow and difficult process.

SUMMARY OF THE INVENTION

The present invention is directed to gum compositions utilizing an improved carbohydrate syrup composition and methods of preparing the gum compositions. The improved carbohydrate syrup used in the gum compositions produces a gum composition which overcomes these and other disadvantages of prior known gum compositions and preparation methods.

According to one aspect of the present invention, an improved method of preparing a gum composition generally comprises the steps of providing a syrup of water and carbohydrate solids having less than about 30% solids with a degree of polymerization ("DP") of 1 and at least about 20% solids with a DP of 4 or greater, combining the syrup with a plasticizing agent consisting of glycerine, propylene glycol or a mixture thereof at a weight ratio of between about 0.5:1 and about 100:1 carbohydrate solids to plasticizing agent, evaporating moisture from the mixture so that the total water content of the evaporated syrup-plasticizer composition is less than about 20% by weight; providing a chewable gum base, a bulking agent (selected from the group consisting of sugars, sugar alcohols and mixtures thereof), optional flavors, artificial sweeteners, colors, preservatives and processing aids; and combining the gum base in amount from about 5% to about 75% by weight of the chewing gum composition, the sweet bulking agent in amount from about 5% to about 75% by weight of the chewing gum composition, and the evaporated syrup-plasticizer composition in amount from about 5% to about 75% by weight of the chewing gum composition, and the optional ingredients to form a finished chewing gum composition.

The pre-mixing of the plasticizing agent with the syrup prior to evaporation of its moisture facilitates the process of evaporation and allows the syrup to be evaporated at a higher rate and to a higher solids level by reducing the viscosity of the syrup. The resulting syrups have a low water content and, when incorporated in the gum formulations of the present invention, add relatively little water to the composition.

Other aspects of the present invention are directed to gum compositions which include the improved carbohydrate syrup-plasticizer compositions. These gum compositions have improved texture, binding, and shelflife characteristics. The carbohydrate DP distribution of the improved syrup compositions promote flexibility and softness in the chewing gum compositions during storage. It is believed that the combination of large amounts of high DP carbohydrate solids with low DP solids provides these flexibility and softness characteristics. It is also believed that these syrup-plasticizer compositions reduce the susceptibility of re-crystallization of ingredients as a result of moisture loss which occurs during storage.

Specifically, such gum compositions according to one aspect of the present invention comprise 5% to 75% by weight of a chewable gum base; 5% to 75% by weight of a bulking agent selected from the group of sugars, sugar alcohols and mixtures thereof; 5% to 75% by weight of a mixture of an aqueous syrup of carbohydrate solids wherein less than about 30% of the carbohydrate solids have a DP of 1 and more than about 20% of the carbohydrate solids have a DP of 4 or greater, and a plasticizing agent selected from the group of glycerine, propylene glycol and mixtures thereof, at a ratio of carbohydrate solids to plasticizing agent of between about 0.5:1 and about 100:1, evaporated to a water content of less than 20%; and optional flavors, artificial sweeteners, colors, preservatives and processing aids.

Carbohydrate distributions for syrup-plasticizer compositions used in the present invention may be obtained by combining a relatively high D.E. corn syrup with a relatively low D.E. corn syrup, each syrup constituting from about 20% to about 80% by weight of the syrup-plasticizer composition.

The present invention, in both its method and composition aspects, will be best understood from the following descriptions of presently preferred embodiments of the invention, which are intended to be merely illustrative of the various aspects of the invention rather than limiting.

DETAILED DESCRIPTION OF THE PRESENTLY PREFERRED EMBODIMENTS

Conventional carbohydrate syrups used in chewing gums typically contain moisture in the range of from about 15% to about 30% by weight. This moisture, when combined with any moisture present in other ingredients, frequently results in undesirable effects including reduced shelf life and unsatisfactory texture characteristics. One aspect of the present invention is based upon the recognition that reducing the moisture level of a carbohydrate syrup will result in an overall decrease in the moisture level of the chewing gum in which the syrup is used. However, the viscosities and recrystalization of carbohydrate syrups during evaporation is highly dependant on the DP distribution of the carbohydrate solids. Syrups with high levels of high DP carbohydrates desirable for use in making chewing gums with good flexibility and binding characteristics are very viscous when evaporated to the low moisture levels found desirable in the present invention.

While in theory the carbohydrate solids DP distribution may be contrived by mixing individual components, generally only dextrose and sorbitol (and to a slight extent maltose) are available commercially by themselves. Typically, the DP distribution of corn syrups and hydrogenated starch hydrolysate syrups are governed by the method of preparation, and a broad variety of different DP components are present. Thus, typically a syrup having a large proportion of solids with a DP of 4 or greater will have many of the solids with a DP of 7, 8 and even 10 or more. Syrups such as these have in the past presented practical limitations on the amounts of moisture which can be removed economically from the syrups using conventional evaporating equipment.

In general, the carbohydrate syrups useful in the present invention have less than 30% solids with a DP of 1 and more than about 20% solids with a DP of 4 or greater. More preferably, the level of solids with a DP of 1 is less than about 10% by weight. For some applications, particularly sugar and corn syrup carbohydrate syrups, it is preferable to have 30% or more solids with a DP of 4 or greater, most preferably about 35% to 40% solids with a DP of 4 or greater.

In general, the improved method of preparing a carbohydrate syrup composition according to the present invention comprises the step of combining a carbohydrate syrup with a glycerine or propylene glycol plasticizing agent in a weight ratio of between about 0.5:1 and about 100:1, preferably between 0.75:1 and 40:1 and most preferably between 2:1 and 30:1, carbohydrate solids to plasticizing agent, and evaporating the moisture initially present in the syrup-plasticizing agent combination.

The glycerine or propylene glycol plasticizing agent, which is combined with the carbohydrate syrup, facilitates the evaporation of moisture initially present in the syrup-plasticizing agent combination and permits the evaporation of the moisture using conventional evaporating equipment. In particular, the plasticizing agent reduces the viscosity of the syrup to speed the evaporation process and allow reduction of moisture to desired low levels. It also facilitates handling and storage of the syrup after evaporation.

As used herein, the term "carbohydrate" is intended to be used in its broadest sense to cover sugars and starch hydrolysates, such as but not limited to saccharides, polysaccharides (such as corn syrup solids), starches and mixtures thereof, as well as sugar alcohols and hydrogenated starch hydrolysates, such as but not limited to hydrogenated saccharides, hydrogenated polysaccharides, hydrogenated starches and mixtures thereof.

Known plasticizing agents include glycerine (also known as glycerol), propylene glycol and mixtures thereof. The preferred plasticizing agent is glycerine. The glycerine will preferably contain less than 1% water. Glycerine with higher moisture content can be used but correspondingly greater evaporation of the syrup will be required. The syrup and plasticizing agent are combined using conventional mixing apparatus which is well known in the art.

In the present invention, moisture initially present in the syrup-plasticizing agent combination is removed by evaporation. The amount of moisture which can be evaporated will depend upon the initial moisture level of the carbohydrate syrup, the amount of plasticizing agent used and the carbohydrate distribution of the syrup. The amount of moisture removal preferred will also depend on these same factors and the other ingredients in the composition in which the carbohydrate syrup is used. It is recognized that the easy evaporation of moisture made possible by the addition of a plasticizing agent will not be beneficial in all contexts, but in the context of the present invention, the method permits removal of initial moisture by amounts of 20%, 50% or even 75%. For syrup-plasticizer compositions used in chewing gums in the present invention, the moisture level will be evaporated to below 20%, preferably below 14% for some compositions and as low as 10% or even 5% for other compositions.

The evaporation of the syrup composition used in the present invention can be accomplished using conventional evaporation equipment, two examples of which are next described. The preferred evaporator is a known agitated heated kettle such as a 150-gallon size kettle with an anchor type impeller such as the device manufactured by Groen Process Equipment Group, a Division of the Dover Corporation of Elk Grove Village, Illinois. In such an evaporator, a high-viscosity material cannot be stirred. In the present invention, the plasticizing agent keeps the viscosity of the evaporating syrup composition low to permit moisture to be evaporated from the syrup, leaving desired relatively high solids levels.

Alternatively, a tube evaporator, preferably a device such as a thin film evaporator manufactured under the trademark "PARAVAP" by APV Equipment, Incorporated of Tonowanda, New York, can also be used. This evaporator is a "falling film" type evaporator in which the material from which the moisture is to be evaporated descends the sides of a heated tube or pipe, which conducts heat to evaporate the moisture. If the material is too viscous, it would not flow down the tube.

Another evaporator known as a "wiped film evaporator" such as the device manufactured by the Luwa Corporation of Charlotte, North Carolina can also be used for high-viscosity materials. Such an evaporator is similar to a tube evaporator, but employs a wiping blade inside the tube which removes materials from contact with the surface of the tube. Although this evaporator is excellent for use with heat-sensitive and high-viscosity materials because of the action of the wiping blade, it is more expensive than an equivalent tube evaporator and requires more maintenance. Thus it is not conventionally used to evaporate carbohydrate syrups. The present invention makes it possible to use the conventional evaporating equipment without resort to use of a wiped film evaporator.

In syrup compositions used in the present invention employing corn syrups, the carbohydrate solids therein comprise not more than about 30% and preferably not more than 20% by weight saccharides having a DP of 1. Such a carbohydrate distribution can be obtained by using a relatively low D.E. corn syrup such as the syrup manufactured by the A.E. Staley Manufacturing Company of Decatur, Illinois under the brandname "Staley 300". This syrup has a D.E. of about 35, with a carbohydrate solids distribution of about 14% with a DP of 1 and about 63% with a DP of 4 or greater. This solids distribution is in the range of syrups preferred for use in certain chewing gums because of the texture and binding effects which such low D.E. syrups achieve.

Preferred carbohydrate distributions may be obtained by using a blend of relatively low D.E. and high D.E. syrups. As used herein, the term "relatively low D.E." refers to a D.E. of not greater than about 40, and "relatively high D.E." refers to a D.E. of not less than about 40.

In one embodiment of the invention using starch hydrolysates (corn syrup solids), the syrup mixture preferably comprises 1–5% plasticizing agent, not less than about 20% by weight maltose and not less than about 10% by weight of saccharides having DP 10 or greater, the carbohydrate percentages being expressed in terms of dry solids in the syrup. This preferred carbohydrate distributions can be readily obtained by combining a relatively high D.E. high-maltose corn syrup with a relatively low D.E. corn syrup, both syrups constituting within the range of from about 25% to about 70% by weight of the syrup-plasticizer mixture. A preferred range of maltose in the high D.E. syrup is between about 40% and about 50% by weight of dry solids.

In terms of dry solids, a specific preferred syrup mixture of this embodiment comprises about 32% by weight maltose, about 20% by weight of saccharides having DP 10 or greater, and about 6% by weight dextrose. This formulation can be obtained by combining a 50 D.E., high-maltose syrup with a 20 D.E. syrup in the following weight percentage amounts: about 55% by weight of the high D.E. corn syrup, and about 42.5% by weight of the low D.E. corn syrup; the remainder comprises a platicizing agent. In the high D.E. syrup, maltose should constitute about 44% by weight of dry solids.

The syrup mixture of this embodiment of the invention may be added to a chewing gum composition as a substitute for conventional corn syrups, and, apart from preparation of the syrup and the step of adding it to chewing gum, the remaining aspects of chewing gum manufacture may be carried out in accordance with techniques which are well-known in the art.

EXAMPLE 1

An example of a preferred formulation for use in one embodiment of the invention uses combined carbohydrate syrups as follows:

| Ingredient | % By Weight |
|---|---|
| 50 D.E. (high maltose) corn syrup | 55.0 |
| 20 D.E. corn syrup | 42.5 |
| Glycerol (or propylene glycol) | 2.5 |
| | 100.0 |

The weight percentages are amounts of ingredients in the syrup mixture prior to evaporation of water therefrom. After the syrups and plasticizer are combined, water is evaporated from the mixture until a moisture level of not greater than about 14% by weight is obtained. When evaporation is completed, the amount of plasticizer in the syrup will be about 3% by weight of the syrup. The high and low D.E. syrups in this example are supplied by the A. E. Staley Manufacturing Company under the brand names, "Staley 7350" (high maltose syrup) and "Staley 200", respectively. The carbohydrate solid distribution of this combined syrup has about 6% solids with a DP of 1 and about 45% solids with a DP of 4 or greater.

A chewing gum composition which benefits from the characteristics imparted by the above syrup composition can be prepared by combining the following ingredients in a conventional manner.

| Ingredient | % By Weight |
|---|---|
| Gum Base | 20.0 |
| Sugar | 54.3 |
| Syrup of Example 1 | 25.0 |
| Flavor | 0.7 |
|  | 100.0 |

Conventional gum bases and flavorings can be used. The chewing gum will have good textural properties which will be retained over prolonged storage.

The carbohydrate solids in the carbohydrate syrup compositions used in the present invention may comprise hydrogenated starch hydrolysates solids, corn syrup solids or a mixture of hydrogenated starch hydrolysates solids and corn syrup solids. The hydrogenated starch hydrolysates solids preferably comprise not more than about 25% by weight hydrogenated saccharides having a DP of 1 and not less than 20% by weight hydrogenated saccharides having a DP of 4 or greater. A preferred hydrogenated starch hydrolysate syrup is the "LYCASIN" brand hydrogenated starch hydrolysate syrup manufactured by the Roquette Corporation of New York, New York (hereinafter "Lycasin HSH").

This syrup contains about 25% water. The carbohydrate distribution of Lycasin HSH is about 6% oligosaccharides of a DP of 1, about 52% with a DP of 2, about 18% with a DP of 3, about 1.5% with a DP of 4, about 2% with a DP of 5, about 3.7% with a DP of 6, about 3.4% with a DP of 7, about 2.2% with a DP of 8, about 1.0% with a DP of 9 and about 11% with a DP of 10 or greater. Lycasin HSH thus has about 24% carbohydrates with a DP of 4 or greater. A higher concentration of high DP hydrogenated starch hydrolysate may be preferred in terms of providing flexibility to chewing gum, but Lycasin HSH is preferred because it is generally recognized as safe in food products and it has non-cariogenic properties which might be lost if a greater amount of high DP carbohydrates were present. Hydrogenated starch hydrolysates and methods for their preparation are described in U.S. Pat. Nos. 4,279,931, issued July 21, 1981, and 4,346,116, issued Aug. 24, 1982.

EXAMPLE 2

A preferred sugarless syrup used in the present invention comprises 78% by weight Lycasin HSH syrup and 22% glycerine. The initial moisture content of this syrup is 20%, but is reduced to 8% by evaporation in an agitated kettle to yield a product with 67% Lycasin HSH solids, 25% glycerine and 8% water. The Lycasin HSH solids distribution is unchanged by the process.

A preferred sugarless chewing gum formula which uses this syrup can be produced by combining the following ingredients:

| Ingredient | % By Weight |
|---|---|
| Gum Base | 25.0 |
| Syrup | 17.0 |
| Sorbitol | 49.0 |
| Mannitol | 8.0 |
| Flavor | 1.0 |
|  | 100.0 |

The total moisture content of the gum will be less than 2%, but the product will be unusually flexible for a sugarless gum. Moreover, because of the low moisture content the product will not dry out and aspartame (if added as an optional ingredient) will exhibit good stability.

EXAMPLE 3

Non-tack chewing gum base formulas are described in U.S. Pat. No. 3,948,380 to Comollo. These bases produce chewing gums which are desirable in that they do not adhere to teeth or to most dental appliances. However, the nature of these gum bases is such that they require good binding characteristics in the gum formulas in which they are used. The gums also tend to dry out and become brittle over time.

It may be advantageous to combine a hydrogenated starch hydrolysate syrup with a corn syrup for use with such non-tack gum bases. One such combination is produced by combining the previously described "Staley 200" corn syrup in an amount of about 35% by weight of the combination with Lycasin HSH in an amount of about 60% by weight of the combination and glycerine in an amount of about 5% by weight of the combination. The water content of the syrup is reduced from about 23% to about 16%. At this point the syrup will comprise about 78% carbohydrate solids, 16% water and a little more than 5% glycerine. The carbohydrate solids distribution will be less than 7% with a DP of 1 and greater than 40% with a DP of 4 or greater.

A non-tack, peppermint flavored chewing gum using a gum base as disclosed in the Comollo patent and this combined syrup can be prepared from the following formula:

| Ingredient | % By Weight |
|---|---|
| Gum Base | 20.0 |
| Sugar | 54.3 |
| Syrup | 25.0 |
| Peppermint Oil | 0.7 |
|  | 100.0 |

The gum so produced will have good cohesion and chewing texture. It will also exhibit improved resistance to drying out when stored over long periods of time due to the hygroscopicity of the Lycasin HSH solids.

It should be understood that the chewing gum compositions and methods described in detail herein are merely illustrative of various aspects of the invention rather than limiting, and that various changes and modifications to the presently preferred embodiments described may be made. It is intended that the following claims, including all equivalents, therefore define the scope of the invention.

We claim:

1. A method of preparing a chewing gum composition comprising the steps of:
   (a) combining a syrup, containing water and carbohydrate solids having less than about 30% solids with a degree of polymerization (DP) of 1 and at least about 20% solids with a DP of 4 or greater, with a plasticizing agent consisting of glycerine, propylene glycol or a mixture thereof at a weight ratio of between about 0.5:1 and about 100:1 carbohydrate solids to plasticizing agent;

(b) evaporating moisture initially present in the syrup-plasticizer composition so that the total water content of the evaporated syrup-plasticizer composition is less than about 20% by weight;

(c) providing a chewable gum base; a bulking agent selected from the group consisting of sugars, sugar alcohols and mixtures thereof; optional flavors; artificial sweeteners; colors; preservatives and processing aids; and (d) combining the gum base in amount from about 5% to about 75% by weight of the chewing gum composition, the sweet bulking agent in amount from about 5% to about 75% by weight of the chewing gum composition, and the evaporated syrup-plasticizer composition in amount from about 5% to about 75% by weight of the chewing gum composition, and the optional ingredients to form a finished chewing gum composition having a total moisture content of less than 2%.

2. The method of claim 1 wherein at least 20% of the moisture initially present in the carbohydrate syrup-plasticizing agent combination is evaporated therefrom.

3. The method of claim 1 wherein at least 50% of the moisture intitially present in the carbohydrate syrup-plasticizing agent combination is evaporated therefrom.

4. The method of claim 1 wherein at least 75% of the moisture initially present in the carbohydrate syrup-plasticizing agent combination is evaporated therefrom.

5. The method of claim 1 wherein the final moisture level of the carbohydrate syrup-plasticizer composition is not more than 14% by weight thereof.

6. The method of claim 1 wherein the final moisture level of the carbohydrate syrup-plasticizer composition is not more than 10% by weight thereof.

7. The method of claim 1 wherein the final moisture level of the carbohydrate syrup-plasticizer composition is not more than 5% by weight thereof.

8. The method of claim 1 wherein the carbohydrate solids comprise corn syrup solids.

9. The method of claim 1 wherein the carbohydrate solids comprise hydrogenated starch hydrolysate solids.

10. The method of claim 1 wherein the carbohydrate solids comprise a mixture of corn syrup solids and hydrogenated starch hydrolysate solids.

11. The method of claim 1 wherein the evaporating step is carried out by agitating and heating the syrup-plasticizing agent combination in an agitated heated kettle.

12. The method of claim 1 wherein the evaporating step is carried out by passing the carbohydrate syrup-plasticizing agent combination through a thin film evaporator.

13. The method of claim 1 wherein the plasticizing agent is glycerine at a weight ratio of from about 0.75:1 to about 40:1 carbohydrate solids to glycerine.

14. The method of claim 13 wherein the ratio of carbohydrate solids to glycerine is between about 2:1 and about 30:1.

15. The method of claim 1 wherein the carbohydrate solids comprise less than about 20% carbohydrates having a DP of 1.

16. The method of claim 1 wherein the carbohydrates solids comprise less than about 10% carbohydrates having a DP of 1.

17. The method of claim 1 wherein the carbohydrate solids comprise hydrogenated starch hydrolysates with about 24% of the carbohydrates having a DP of 4 or greater.

18. The method of claim 1 wherein the carbohydrate solids comprise corn syrup solids with about 30% or more of the carbohydrates having a DP of 4 or greater.

19. The method of claim 18 wherein about 35% to 40% of the carbohydrate solids have a DP of 4 or greater.

20. The method of claim 1 wherein the carbohydrate solids comprise hydrogenated starch hydrolysate solids containing about 6% oligosaccharides of a DP of 1, about 52% with a DP of 2, about 18% with a DP of 3 and about 11% with a DP of 10 or greater.

21. The method of claim 1 wherein the carbohydrate solids are corn syrup solids comprising not less than about 20% by weight maltose.

22. The method of claim 1 wherein the carbohydrate syrup comprises a mixture of 20% to 80% by weight of a syrup with a D.E. greater than 40 and 20% to 80% of a syrup with a D.E. of less than 40.

23. A method of preparing a gum composition comprising the steps of:

(a) providing a chewable gum base in an amount within a range of from 5% to 75% by weight of said gum composition;

(b) providing a bulking agent selected from the group of sugars, sugar alcohols and mixtures thereof in an amount within a range of from 5% to 75% by weight of said gum composition;

(c) providing a carbohydrate syrup comprising an aqueous solution of carbohydrate solids, said syrup selected from the group of corn syrups, hydrogenated starch hydrolysates and mixtures thereof, wherein less than about 30% by weight of said carbohydrate solids have a DP of 1 and more than about 20% of said carbohydrate solids have a DP of 4 or greater;

(d) providing a plasticizing agent selected from the group of glycerine, propylene glycol and mixtures thereof, (e) combining said carbohydrate syrup with said plasticizing agent at a ratio of carbohydrate solids to plasticizing agent of between about 0.5:1 and about 100:1 to form a mixture;

(f) evaporating moisture present in said mixture to produce a dehydrated mixture containing less than 20% water by weight; and (g) combining said dehydrated mixture in an amount within a range of from 5% to 75% by weight of said gum composition with said gum base and said bulking agents and optional flavors, artificial sweeteners, colors, preservatives and processing aids to form a finished gum composition having a moisture content or less than 2%.

24. A gum composition having a moisture content of less than 2% comprising:

(a) 5% to 75% by weight of a chewable gum base;

(b) 5% to 75% by weight of a bulking agent selected from the group of sugars, sugar alcohols and mixtures thereof;

(c) 5% to 75% by weight of a dehydrated mixture of (i) an aqueous syrup of carbohydrate solids, said syrup selected from the group of corn syrups, hydrogenated starch hydrolysates and mixtures thereof wherein less than about 30% of said carbohydrate solids have a DP of 1 and more than about 20% of said carbohydrate solids have a DP of 4 or greater; and (ii) a plasticizing agent selected from the group of glycerine, propylene glycol and mixtures thereof;

(iii) said syrup and plasticizing agent being mixed at a ratio of carbohydrate solids to plasticizing agent of between about 0.5:1 and about 100:1;

(iv) wherein the water content of said dehydrated mixture is less than 20%; and (d) optional flavors, artificial sweeteners, colors, preservatives and processing aids.

25. A chewing gum composition to which has been added a carbohydrate syrup mixture to improve the flexibility retention of the gum; the added syrup mixture comprising water in an amount not greater than about 20% by weight of the mixture, starch hydrolysate solids having less than 30% solids with a DP of 1 and at least about 20% solids with a DP of 4 or greater, and a plasticizing agent selected from the group consisting of glycerol and propylene glycol and constituting from about 1% to about 5% by weight of the mixture, said gum composition comprising less than 2% moisture.

26. The chewing gum composition of claim 25 wherein the amount of plasticizing agent is about 3% by weight of the mixture.

27. The chewing gum composition of claim 25 wherein the amount of water is not greater than about 14% by weight of the mixture.

28. The chewing gum composition of claim 25 wherein the carbohydrate syrup comprises: a high D.E. corn syrup constituting from about 25% to about 70% by weight of the mixture and having a D.E. of not less than about 40; and a low D.E. corn syrup constituting from about 25% to about 70% by weight of the mixture and having a D.E. of not greater than about 40.

29. The chewing gum composition of claim 25 having a reduced water content obtained by removing water from the syrup mixture before adding the mixture to the gum such that the mixture has a reduced water content of not greater than about 14% by weight of the mixture.

30. In a method for manufacturing chewing gum containing less than 2% moisture, the step of adding to the gum a carbohydrate syrup mixture to improve the flexibility retention of the gum, the syrup mixture comprising water in an amount not greater than about 20% by weight of the mixture, starch hydrolysate solids having less than 30% solids with a DP of 1 and at least about 20% solids with a DP of 4 or greater, and a plasticizing agent selected from the group consisting of glycerol and propylene glycol and constituting from about 1% to about 5% by weight of the mixture.

31. The method of claim 30 wherein the amount of plasticizing agent is about 3% by weight of the mixture.

32. The method of claim 30 further comprising the step of evaporating water from the mixture prior to the step of adding the mixture to the gum.

33. The method of claim 32 wherein water is removed from the syrup mixture until the mixture has a water content of not greater than about 14% by weight.

34. The method of claim 30 wherein the starch hydroylasate solids comprise not less than about 20% by weight maltose.

35. The method of claim 30 wherein the starch hydrolysate solids comprise not less than about 10% by weight of saccharides having a DP of 10 or greater.

36. The method of claim 30 wherein the carbohydrate syrup comprises: a high D.E. corn syrup constituting from about 25% to about 70% by weight of the mixture and having a D.E. of not less than about 40; and a low D.E. corn syrup constituting from about 25% to about 70% by weight of the mixture and having a D.E. of not greater than about 40.

37. The method of claim 1 wherein the plasticizing agent comprises propylene glycol.

38. The gum composition of claim 24 wherein the plasticizing agent comprises propylene glycol.

39. The gum composition of claim 25 wherein the plasticizing agent comprises propylene glycol.

* * * * *

UNITED STATES PATENT AND TRADEMARK OFFICE
CERTIFICATE OF CORRECTION

PATENT NO. : 4,728,515

DATED : March 1, 1988

INVENTOR(S) : Mansukh M. Patel et al.

Page 1 of 2

It is certified that error appears in the above-identified patent and that said Letters Patent is hereby corrected as shown below:

On the cover sheet, column 1, under "Inventors" and after "J. Wokas", please delete "Bollingbrook" and substitute therefor --Bolingbrook--.

In column 1, line 33, please delete "aceptable" and substitute therefor --acceptable--.

In column 3, line 60, please delete "shelf life" and substitute therefor --shelflife--.

In column 3, line 66, please delete "recrystalization" and substitute therefor --re-crystalization--.

In column 3, line 67, please delete "dependant" and substitute therefor --dependent--.

In column 6, line 16, please delete "distributions" and substitute therefor --distribution--.

In column 6, line 33, please delete "platicizing" and substitute therefor --plasticizing--.

In column 6, line 66, after "names" please delete --,--.

UNITED STATES PATENT AND TRADEMARK OFFICE
CERTIFICATE OF CORRECTION

PATENT NO. : 4,728,515

DATED : March 1, 1988

INVENTOR(S) : Mansukh M. Patel et al.

It is certified that error appears in the above-identified patent and that said Letters Patent is hereby corrected as shown below:

IN THE CLAIMS

In column 9, line 66, please delete "carbohydrates" and substitute therefor --carbohydrate--.

In column 10, line 42, after "thereof" please delete "," and substitute therefor --;--.

In column 10, line 56, please delete "or" and substitute therefor --of--.

In column 12, lines 22 and 23, please delete "hydroylasate" and substitute therefor --hydrolysate--.

Signed and Sealed this

Seventeenth Day of December, 1991

Attest:

HARRY F. MANBECK, JR.

*Attesting Officer*          *Commissioner of Patents and Trademarks*